(12) United States Patent
Mariotti

(10) Patent No.: US 10,005,650 B2
(45) Date of Patent: Jun. 26, 2018

(54) INDUSTRIAL TRUCK WITH LOAD ROLLERS LOCATED IN SWIVELING LOAD ROLLER CARRIERS

(71) Applicant: OM Carrelli Elevatori S.p.A., Lainate (IT)

(72) Inventor: Fabio Mariotti, Guastalla (IT)

(73) Assignee: OM Carrelli Elevatori S.p.A., Lainate (IT)

( * ) Notice: Subject to any disclaimer, the term of this patent is extended or adjusted under 35 U.S.C. 154(b) by 242 days.

(21) Appl. No.: 14/042,847

(22) Filed: Oct. 1, 2013

(65) Prior Publication Data

US 2014/0175350 A1    Jun. 26, 2014

(30) Foreign Application Priority Data

Oct. 15, 2012  (DE) .................. 10 2012 109 790
Jan. 17, 2013  (DE) .................. 10 2013 100 469

(51) Int. Cl.
*B66F 9/12*   (2006.01)
*B66F 9/065*  (2006.01)
*B62B 3/06*   (2006.01)

(52) U.S. Cl.
CPC .............. *B66F 9/12* (2013.01); *B62B 3/0631* (2013.01); *B66F 9/065* (2013.01)

(58) Field of Classification Search
CPC .. B66F 9/12; B66F 9/065; B66F 9/122; B62B 3/0631; B62B 3/06; B62B 2206/04; B62B 2203/24
See application file for complete search history.

(56) References Cited

U.S. PATENT DOCUMENTS

| 2,178,647 | A | * | 11/1939 | Raymond | ................. B62B 3/06 254/2 C |
| 2,422,538 | A | * | 6/1947 | Framhein | .............. B62B 3/0618 254/2 B |
| 2,462,007 | A | * | 2/1949 | Schreck | .................... B62B 3/06 280/43.12 |
| 2,550,548 | A | * | 4/1951 | Framhein | ................. B62B 3/06 254/10 C |

(Continued)

FOREIGN PATENT DOCUMENTS

| DE | 102006035822 A1 | * | 2/2008 | .............. B62B 3/06 |
| DE | 102009033709 A1 |   | 1/2011 | |

(Continued)

*Primary Examiner* — Christopher M Koehler
*Assistant Examiner* — Joel Crandall
(74) *Attorney, Agent, or Firm* — The Webb Law Firm

(57) ABSTRACT

An industrial truck (1) has a drive section (2) and a movable load section (4). The load section (4) has at least one wheelarm (5) with at least one load roller (6) rotatably mounted in a load roller carrier (12) which is mounted by a swivel bearing (13) on the wheelarm (5). The swivel-bearing (13) is a bearing pin (20). A linkage (10) is connected with the load roller carrier (12) by a coupling pin (21). The load roller carrier (12) has two outer bearing levers (12a, 12b) with bearing flanges (32a, 32b) for mounting the bearing pin (20) and bearing flanges (33a, 33b) for mounting the coupling pin (21), and an additional web (30) located between the outer bearing levers (12a, 12b) and having a bearing flange (32c) for mounting the bearing pin (20) and/or a bearing flange (33c) for mounting the coupling pin (21).

6 Claims, 8 Drawing Sheets

(56) References Cited

U.S. PATENT DOCUMENTS

| | | | | | |
|---|---|---|---|---|---|
| 2,623,756 | A | * | 12/1952 | Elliott | B62B 3/0612 254/2 B |
| 3,525,501 | A | * | 8/1970 | Goetz | B62B 3/06 254/2 R |
| 5,354,080 | A | | 10/1994 | Jones | |
| 8,336,913 | B1 | * | 12/2012 | Aaseby | B60B 11/02 280/38 |
| 2002/0034431 | A1 | * | 3/2002 | Fransson | B60G 17/0272 414/495 |

FOREIGN PATENT DOCUMENTS

| | | | | |
|---|---|---|---|---|
| EP | 1690823 | A2 | | 8/2006 |
| FR | 2511661 | A1 | * | 2/1983 ........... B62B 3/0618 |
| SE | 352868 | | | 1/1973 |

\* cited by examiner

INDUSTRIAL TRUCK WITH LOAD ROLLERS LOCATED IN SWIVELING LOAD ROLLER CARRIERS

CROSS REFERENCE TO RELATED APPLICATIONS

This application claims priority to German Applications DE 102012109790.9 filed Oct. 15, 2012 and DE 102013100469.5 filed Jan. 17, 2013, which are herein incorporated by reference in their entirety. This application is related to U.S. application Ser. No. 14/044,042 entitled "Industrial Truck With Wheelarm Lever System" issued as U.S. Pat. No. 9,309,096 on Apr. 12, 2016 and U.S. patent application Ser. No. 14/043,972 entitled "Industrial Truck With Load Rollers Located On Load Roller Carriers On A Wheelarm" issued as U.S. Pat. No. 9,567,197 on Feb. 14, 2017, both filed concurrently herewith and both herein incorporated by reference in their entirety.

BACKGROUND OF THE INVENTION

Field of the Invention

This invention relates to an industrial truck, in particular a lift truck, with a drive section and a load section that can be moved relative to the drive section. The load section has at least one wheelarm which is provided with at least one load roller. The load roller is rotatably mounted in a load roller carrier and the load roller carrier is swivel-mounted by a swivel bearing on the wheelarm. A bearing pin is mounted in the wheelarm for the swivel-mounting of the load roller carrier. A linkage is in an operational connection with the load roller carrier for actuation of the load roller carrier and is connected in an articulated manner with the load roller carrier by a coupling pin.

Description of Related Art

Industrial trucks with wheelarms are used to lift pallets by driving the wheelarms under a pallet and then lifting the wheelarms to lift the pallet. For this purpose, the load section is raised or lowered relative to the drive section. The load roller carriers in which the load rollers are mounted are actuated by a system of levers and a linkage and can be pivoted outwardly and downwardly or inwardly and upwardly, respectively, to raise or lower the wheelarms. On low-lift trucks or order pickers, a lifting movement of this type is called a low lift, while on high-lift trucks with an additional lifting frame it is called the initial lift.

Lift trucks of this type with load rollers located on the wheelarms in pivoting load roller carriers which are actuated by a linkage and a system of levers are described, for example, in EP 1 690 823 B1 or DE 10 2009 033 709 A1. The height of the wheelarms in the lowered position is determined essentially by the design of the swivel bearing of the load roller carrier on the wheelarm and the design of the articulated coupling of the linkage with the load roller carrier. Among other things, the diameter of the bearing pins and of the coupling pins determine the height of the wheelarms in the lowered position. Conventional lift trucks have bearing pins and coupling pins with relatively large diameters and are designed for the handling of standardized "euro pallets", which have an entry height for the wheelarms of 100 mm. For this purpose, the trucks have a height of the wheelarms in the fully lowered position in the range of approximately 85 mm.

Because of the design of the swivel bearing of the load roller carrier on the wheelarm and the design of the articulated coupling of the linkage with the load roller carrier using relatively large-diameter bearing pins and coupling pins, it is not possible to reduce the height of the wheelarm to enable these known industrial trucks to handle special pallets, such as pallets having an entry height that is lower than on standard euro pallets.

An object of this invention is to provide an industrial truck of the general type described above but which makes possible a compact realization of the wheelarms with a low wheelarm height in the lowered position of the load section, to enable the truck to handle special pallets which have a low entry height.

SUMMARY OF THE INVENTION

This object is accomplished by the invention in that the load roller carriers include two outer bearing levers having bearing pin bearing flanges for the mounting of the bearing pin and coupling bearing flanges for the mounting of the coupling pin. At least one additional web is located between the outer bearing levers. The web includes a bearing flange for mounting of the bearing pin and/or a bearing flange for mounting of the coupling pin. On the industrial truck of the invention, on the load roller carrier, in addition to the outer bearing levers in which there are bearing flanges for the mounting of the bearing pin and bearing flanges for the mounting of the coupling pin, respectively, there is at least one additional central bearing flange for the bearing pin and/or the coupling pin. The central flange is formed on a central web of the load roller carrier. At least one additional bearing flange is thereby provided so that the bearing pin can be mounted and supported on more than two bearing flanges on the wheelarm and the coupling pin can be mounted and supported on more than two bearing flanges on the load roller carrier, into which bearing flanges the forces that occur during lifting and lowering can be transmitted and absorbed. It thereby becomes possible to reduce the diameter of the bearing pin and/or of the coupling pin and to achieve low loads caused by forces exerted on it without the danger of deflection or deformation of the bearing pin or of the coupling pin, as a result of which the wheelarm in the lowered position can have a lower height.

In one advantageous development of the invention, the wheelarm has outer bearing flanges for mounting of the bearing pin and inner bearing flanges for mounting of the bearing pin. The outer bearing levers of the load roller carrier are located respectively between the outer bearing flange and the inner bearing flange of the wheelarm. For the support and mounting of the bearing pin in the wheelarm, there are therefore at least four bearing flanges on the wheelarm, so that the forces that occur can be transmitted into the wheelarm at low loads and minor deflection or deformation of the bearing pin and the diameter of the bearing pins can be reduced.

In one particularly advantageous embodiment of the invention, the web of the load roller carrier is located between the two inner bearing flanges of the wheelarm. This results in a bearing system for the bearing pin which is supported in alternation in a bearing flange of the wheelarm and a bearing flange of the load roller carrier. This makes it possible to achieve a mounting of the bearing pin which makes possible a particularly effective reduction of the diameter of the bearing pin and a low height of the wheelarms in the lowered position.

In one particularly advantageous embodiment of the invention, the linkage is provided with a bearing fork having two bearing segments for the mounting of the coupling pin, which is located between the outer bearing levers of the load roller carrier. The web of the load roller carrier is located between the two bearing segments of the linkage. It is thereby possible in a simple manner for the coupling pin, by means of which the linkage is connected in an articulated manner to the load roller carrier, to be mounted and supported on the two bearing flanges of the outer bearing levers and the central bearing flange of the additional web of the load roller carrier. This arrangement also makes it possible in a simple manner to mount and support the coupling pin, by means of which the linkage is connected in an articulated manner to the load roller carrier, on the two bearing flanges of the outer bearing forks and the central bearing flange of the additional web of the load roller carrier. With this arrangement, it also becomes possible to transmit the forces that occur on the coupling pin at low loads and minor deflections or deformations of the coupling pin and to reduce the diameter of the coupling pin.

In one preferred development of the invention, stop means for the lowered position of the wheelarm are located between the load roller carrier and the wheelarm. With stop means of this type between the load roller carrier and the wheelarm, the forces that occur when the wheelarms are lowered are transmitted directly from the load roller carrier into the wheelarm and, thus, the forces that act on the bearing pins and the coupling pins in the lowered position of the wheelarms can be reduced so that sudden loads that occur, such as during traction operation of the industrial truck with fully lowered wheelarms, can be transmitted directly into the wheelarm. This measure makes it possible to further reduce the diameter of the bearing pin and of the coupling pin.

In one preferred embodiment of the industrial truck of the invention, the wheelarm has a height of less than 50 mm in the fully lowered position of the load section. The bearing system of the invention for the bearing pin and the coupling pin, as a result of the reduction in the diameter of these pins compared to industrial trucks of the known art, makes possible a significant reduction of the height of the lowered wheelarms, so that the industrial truck of the invention requires little force to be driven underneath and pick up special pallets, for example, pallets made of paper or cardboard, or pallets with an entry height that is lower than a standard euro pallet.

The invention further relates to a system comprising an industrial truck with a maximum wheelarm height in the fully lowered position of the load section of 50 mm and a special pallet which has an entry height of the pickup openings for the wheelarms of the industrial truck (i.e., the distance between the surface of the floor or roadway and an underside of a load-bearing surface of the special pallet) of 50 mm. With the industrial truck of the invention, which on account of the mounting of the bearing pin and the coupling pin has a low wheelarm height in the lowered position, special pallets with a lower entry height can be handled safely and easily.

BRIEF DESCRIPTION OF THE DRAWINGS

Additional advantages and details of the invention are explained in greater detail below with reference to the exemplary embodiment which is illustrated in the accompanying schematic figures in which like reference numbers identify like parts throughout.

DESCRIPTION OF THE PREFERRED EMBODIMENTS

Figure 1:
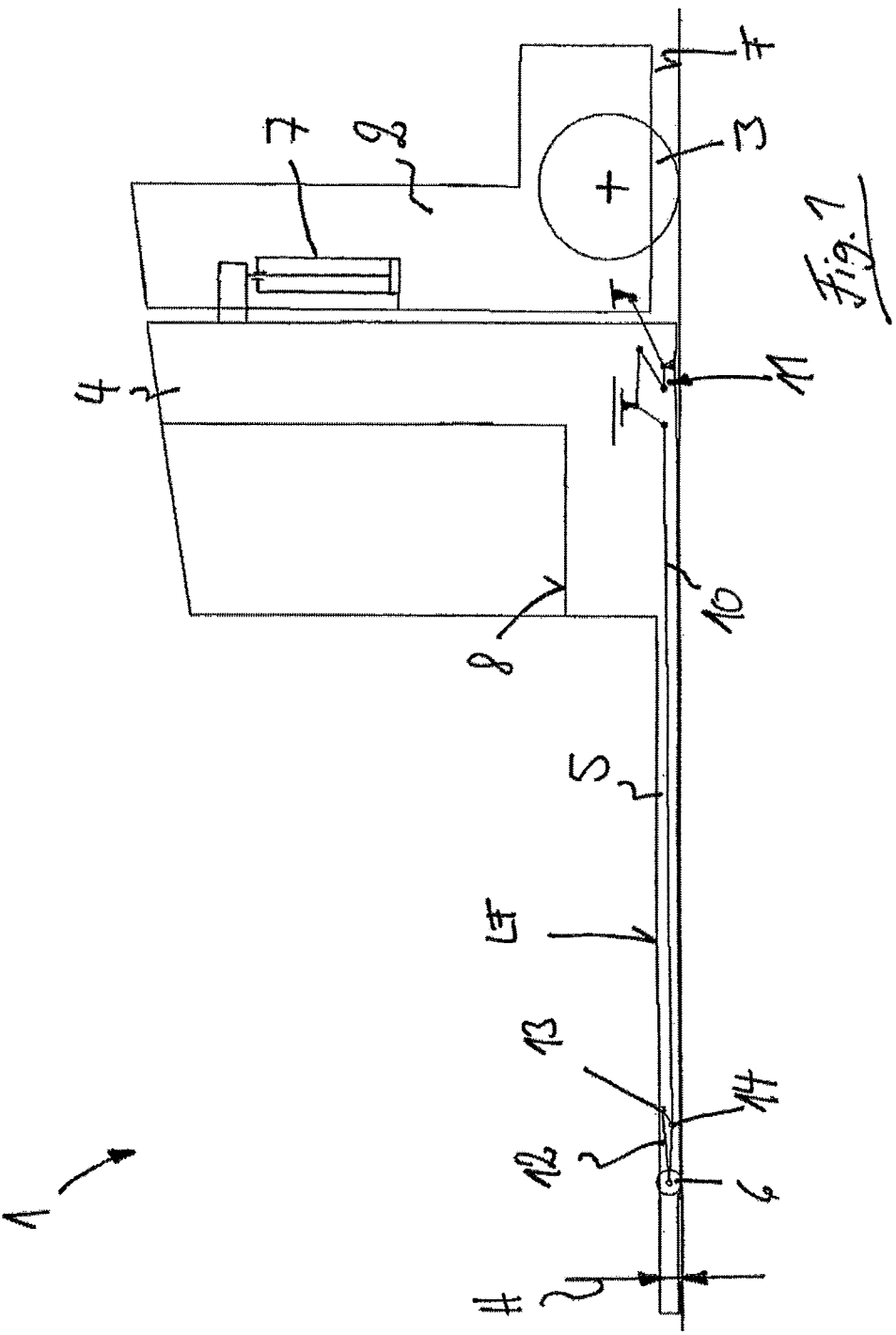
FIG. 1 shows as schematic illustration of an industrial truck of the invention with the load section in the lowered position.
Figure 2:
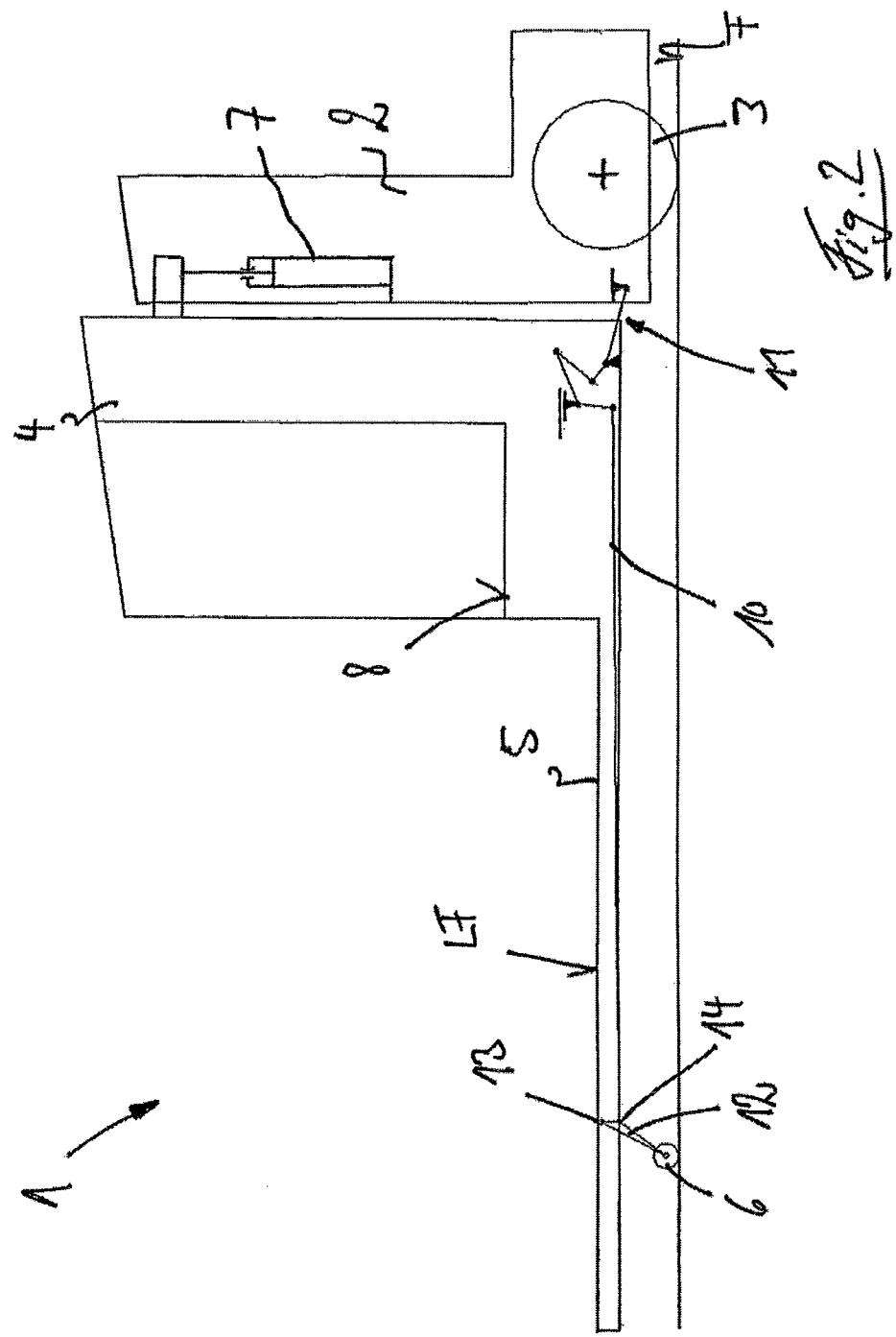
FIG. 2 shows the industrial truck illustrated in FIG. 1 with the load section fully raised.

The industrial truck 1 illustrated in a side view in FIGS. 1 and 2, such as a lift truck in the form of a low-lift truck or a high-lift truck, for example, has a drive section 2 which is provided with a steerable drive wheel 3, and a load section 4 which can be raised and lowered relative to the drive section 2. The load section 4 preferably comprises two wheelarms 5 which are at a spaced lateral distance from each other and are supported on a roadway F by load rollers 6 located at or near the tip of the respective wheelarms 5. The drive section 2 is supported on the roadway F by means of the drive wheel 3. To increase stability, the drive section 2 can be supported on the roadway F by support rollers, which are not illustrated in any further detail. The upper side of the wheelarms 5 forms a load-bearing surface LF, which can be driven under a pallet to lift the pallet, which is not illustrated in any further detail.

To lift the load section 4, a lifting device 7 is provided which includes one or more hydraulic cylinders, for example, and is located between the drive section 2 and the load section 4. To transmit the lifting motion of the load section 4 to the load rollers 6 on the ends of the wheelarms 5, for each wheelarm 5 there is a linkage 10 which is in an operative connection with the load rollers 6 and also with a lever system 11 which actuates the linkage 10. The lever system 11 can also act as a guide to guide the load section 4 during the lifting and lowering movements.

On an industrial truck 1 operated by an electric battery, the load section 4 can also include a battery compartment 8 for a traction battery, which supplies electrical power to an electrical traction drive of the drive wheel 3 and to an electrical drive system of the lifting device 7.

The load rollers 6 are located so that they can rotate in load roller carriers 12, which are located so that they can swivel on the corresponding wheelarms 5. For the swivel-mounting of the load roller carriers 12, a swivel bearing 13 is provided on each wheelarm 5. In the illustrated exemplary embodiment the linkages 10 are in the form of connecting rods. The swivel bearing 13 is located in the vertically upper portion of the wheelarms 5. The linkages 10, which are in the form of connecting rods, are connected by coupling points 14 in an articulated manner with the load roller carrier 12. The coupling points 14 are located in a vertical direction below the swivel bearing 13.

When the load section 4 is raised by the lifting device 7, the load roller carriers 12 (which are actuated by the lever system 11 and the linkage 10 and are provided with the load rollers 6) are swiveled downwardly in the counterclockwise direction around the swivel bearing 13 so that the wheelarms 5 are lifted upwardly. FIG. 2 shows the load section 4 in the fully raised position. Accordingly, when the load section 4 is lowered, the load roller carriers 12 are swiveled in the clockwise direction around the swivel bearing 13, so that the wheelarms 5 are lowered.

The wheelarms 5 of the industrial truck 1 of the invention, in the fully lowered position of the load section 4, have a wheelarm height H of less than 50 mm, so that the industrial truck 1 of the invention can be used to handle special pallets which have an entry height of 50 mm for the wheelarms 5.

FIGS. 3 to 9 illustrate a constructive embodiment of the wheelarms 5 of the industrial truck 1 illustrated in FIGS. 1 and 2.

In the illustrated exemplary embodiment, the swivel bearing 13 of the load roller carrier 12 on the wheelarm 5 has a bearing pin 20. For the articulated connection of the linkage 10 to the load roller carrier 12, there is a coupling pin 21 which forms the coupling point 14.

To achieve the low wheel height H of less than 50 mm in the lowered position of the wheelarms 5, the bearing pin 20 is supported at a plurality of bearing points (in the illustrated exemplary embodiment at four bearing points) on the wheelarm 5 and at a plurality of bearing points (in the illustrated exemplary embodiment at three bearing points) on the load roller carrier 12, so that the bearing pin 20 can have a relatively small diameter compared with the bearing pin of conventional load roller carriers. The coupling pin 21 is also connected with the load roller carrier 12 in a plurality of bearing points (in the illustrated exemplary embodiment at three bearing points) so that the coupling pin 21 can also have a smaller diameter compared with the coupling pin of conventional load roller carriers.

Figure 6:
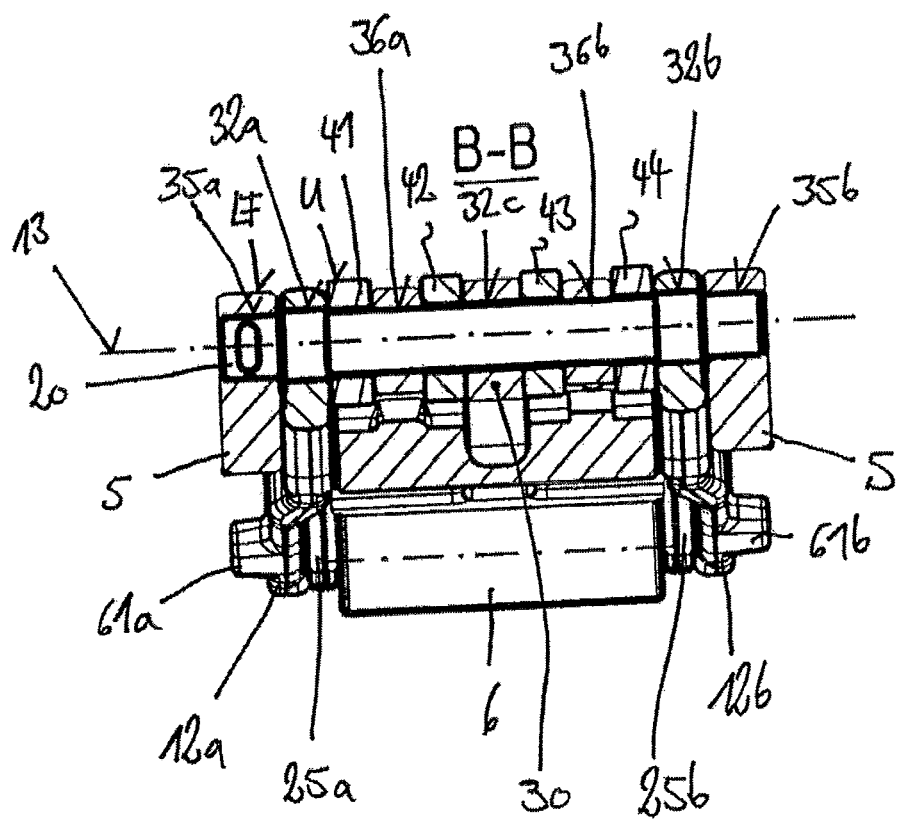
FIG. 6 is a section along line B-B in FIG. 5.
Figure 8:
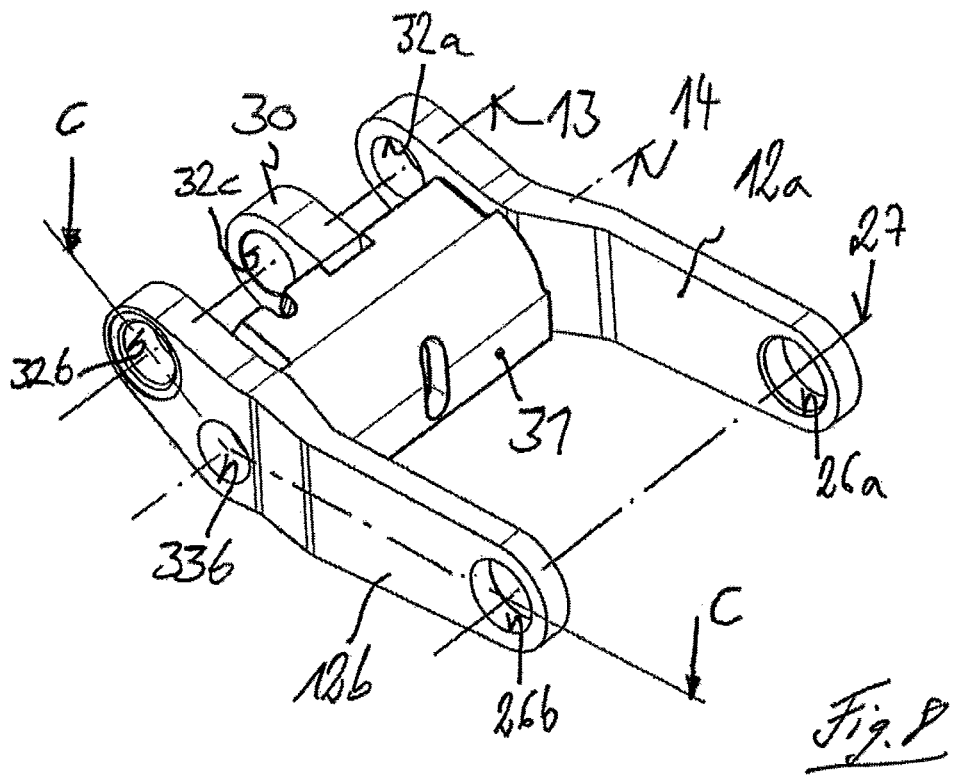
FIG. 8 is a perspective view of a load roller carrier of the industrial truck of the invention.
Figure 9:
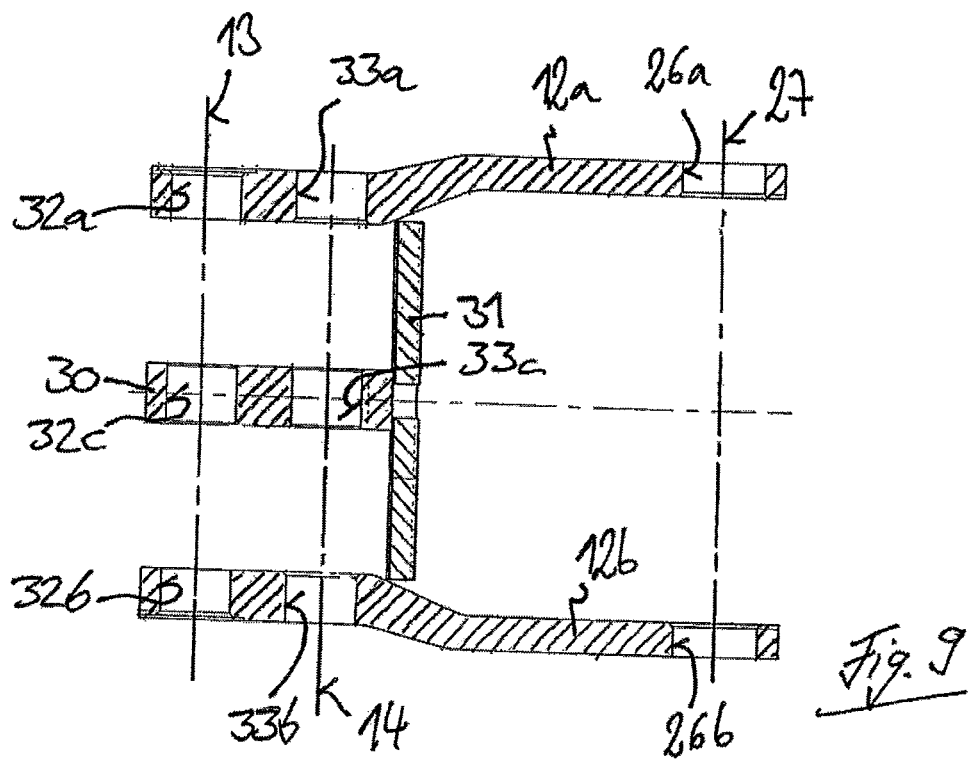
FIG. 9 is a section of the load roller carrier along line C-C in FIG. 8.

For this purpose, the fork-shaped load roller carrier 12 (as illustrated in FIGS. 6, 8, and 9) includes two lateral, outside bearing levers 12a, 12b, between which rockers 25a, 25b are swivel-mounted and in which the load rollers 6 (in the illustrated exemplary embodiment three load rollers 6) are mounted so that they can rotate. In each of the outer bearing levers 12a, 12b, for the swivel mounting of the rockers 25a, 25b, there are respective bearing flanges 26a, 26b for a bearing 27, by means of which the rockers 25a, 25b are swivel-mounted on the bearing levers 12a, 12b. The bearing flanges 26a, 26b for the rockers 25a, 25b are formed by a through bore in the bearing levers 12a, 12b.

In addition, the load roller carrier 12 includes an additional central web 30 in the vicinity of the swivel bearing 13 and the coupling point 14, with the at least one additional central web 30 located between the outer bearing levers 12a, 12b and parallel to them. The web 30 is located and fastened by means of a connecting plate 31 between the outer bearing levers 12a, 12b.

In the outer bearing levers 12a, 12b, bearing flanges 32a, 32b are formed for the mounting of the bearing pin 20 and bearing flanges 33a, 33b for the mounting of the coupling pin 21. In the web 30 of the load roller carrier 12 located between the outer bearing levers 12a, 12b, an additional bearing flange 32c is formed for the mounting of the bearing pin 20 and/or an additional bearing flange 33c for the mounting of the coupling pin 21. The bearing flanges 32a, 32b, 32c for the bearing pin 20 and the bearing flanges 33a, 33b, 33c for the coupling pin 21 are each formed by a through bore in the bearing levers 12a, 12b and the web 30 of the load roller carrier 12. The through bores in the load roller carrier 12, which form the bearing flanges 32a, 32b, 32c for the bearing pin 20, the bearing flanges 33a, 33b, 33c for the coupling pin 21, and the bearing flanges 26a, 26b for the rockers 25a, 25b, are aligned parallel to one another.

Figure 3:
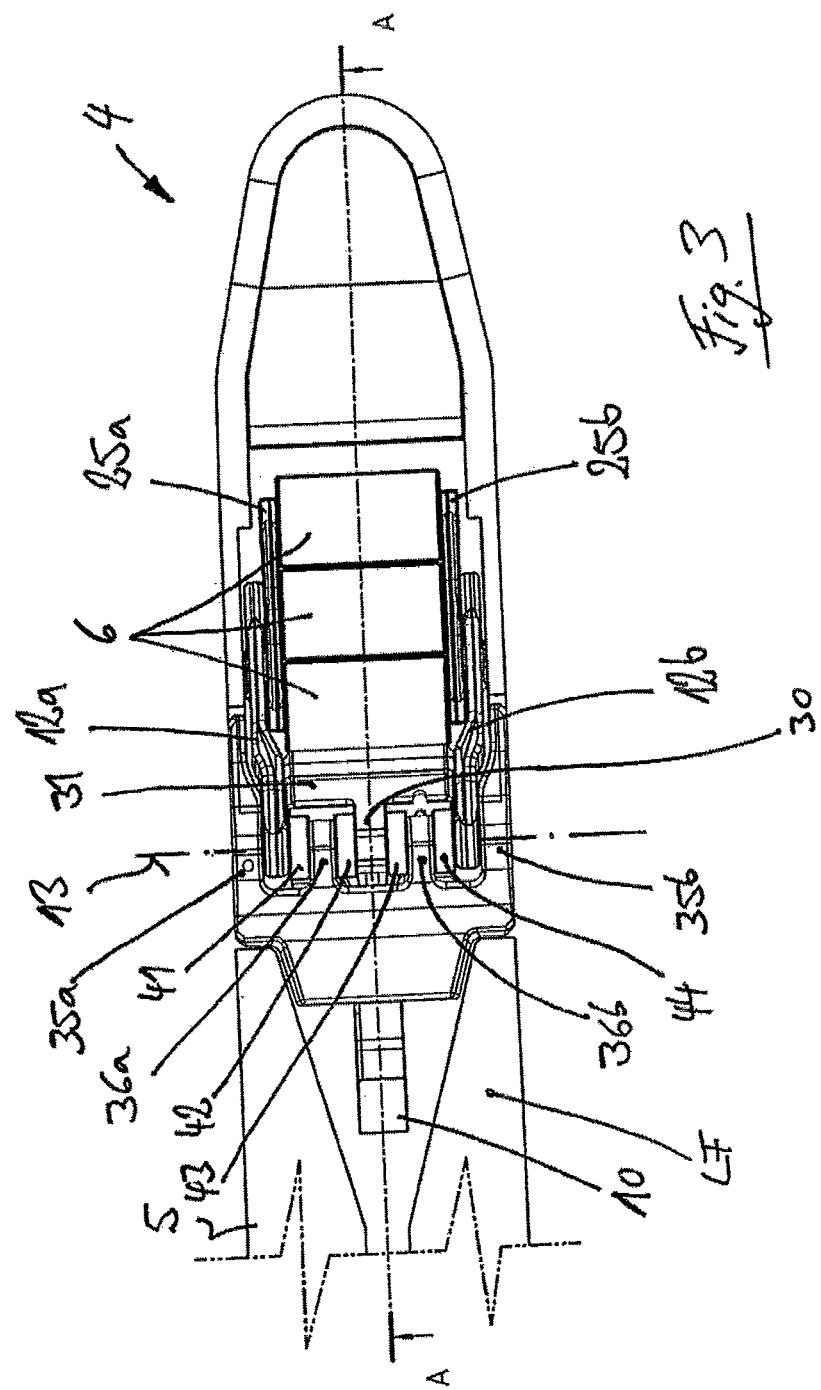
FIG. 3 is a view of the tip of a wheelarm of the industrial truck of the invention illustrated in FIGS. 1 and 2 from above.
Figure 4:
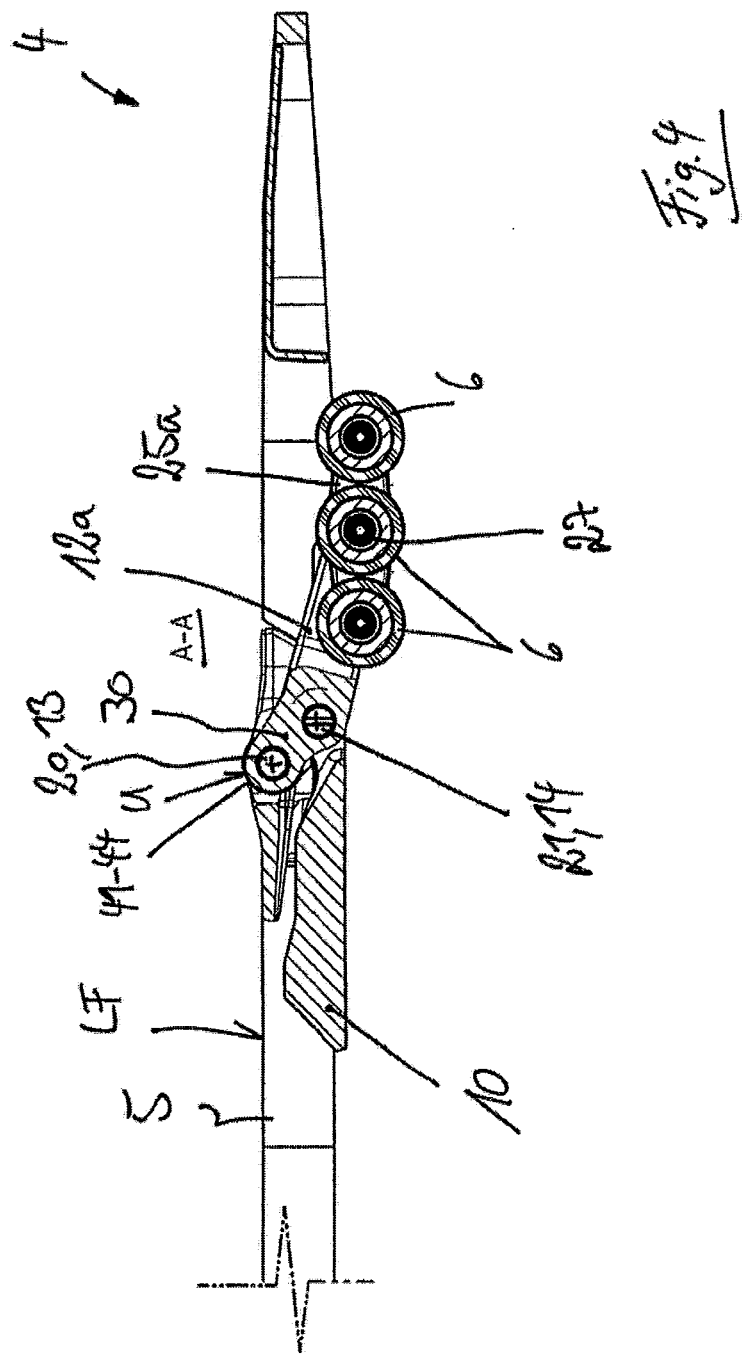
FIG. 4 is a section along line A-A in FIG. 3.
Figure 5:
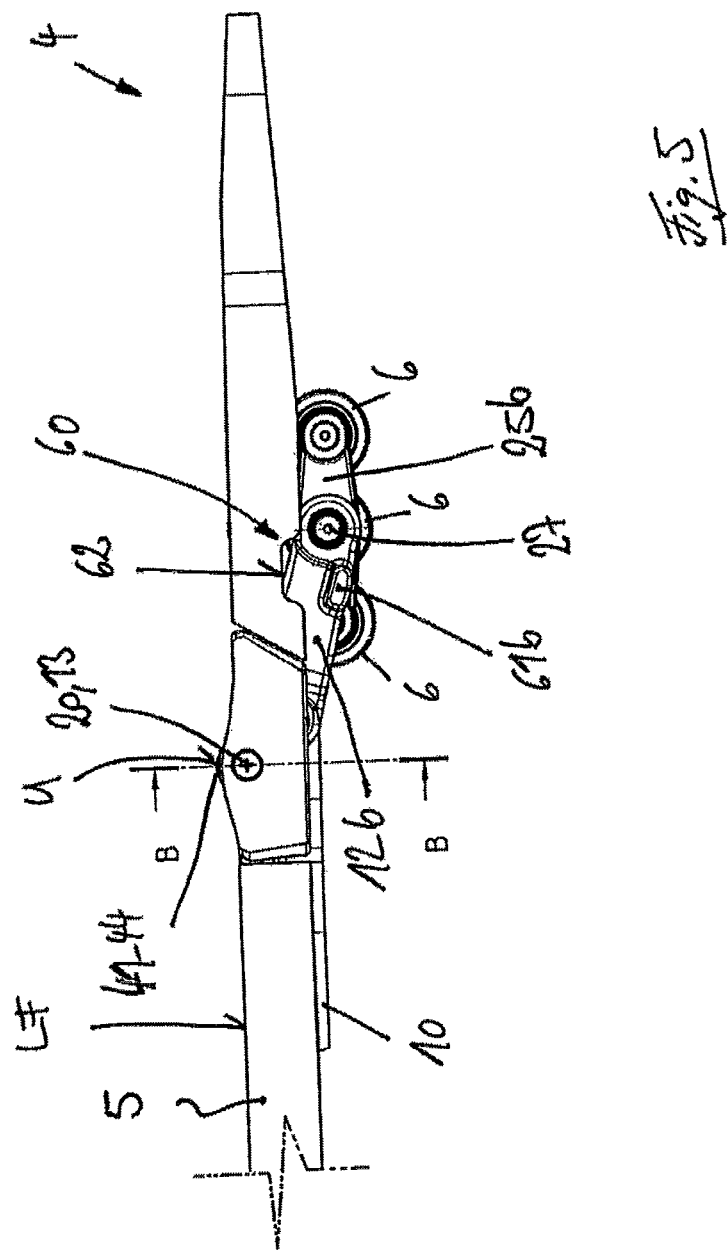
FIG. 5 is a side view of the tip of a wheelarm of the invention.

For mounting of the bearing pin 20 (as illustrated in FIGS. 3 and 6) the wheelarm 5 is provided on each of its outer sides with a bearing fork, each of which forms an outer bearing flange 35a, 35b and an inner bearing flange 36a, 36b for the bearing pin 20. The outer bearing levers 12a and 12b, respectively, of the load roller carrier 12 are each located between the outer bearing flange 35a or 35b, respectively, and the inner bearing flange 36a or 36b, respectively, of a bearing fork of the wheelarm 5. The bearing flanges 35a, 35b, 36a, 36b for the mounting of the bearing pin 20 are formed by a through bore which is located in the corresponding bearing forks of the wheelarm 5.

The additional central web 30 of the load roller carrier 12 is located between the two inner bearing flanges 36a, 36b of the wheelarm 5.

The bearing pin 20 is therefore mounted and supported in alternation in a bearing flange 35a, 36a, 36b, 35b of the wheelarm 5 and a bearing flange 32a, 32c, 32b of the load roller carrier 12.

The industrial truck 1 is also provided in the vicinity of the swivel bearing 13 of the load roller carrier 12 on the upper side of the respective wheelarm 5 with an entry guide to facilitate driving the truck under the pallet. The entry guide is formed by at least one roller 41, 42, 43, 44 mounted so that it can rotate on the bearing pin 20. The rollers 41, 42, 43, 44 have a diameter such that the peripheral surface U of the rollers 41, 42, 43, 44 projects slightly beyond (above) the load-bearing surface LF on the upper side of the corresponding wheelarm 5.

In the illustrated exemplary embodiment, one roller is located between each inner bearing flange 36a, 36b of the wheelarm 5 and the central web 30 provided with the central bearing flange 32c of the load roller carrier 12, and between each inner bearing flange 36a, 36b of the wheelarm 5 and the outer bearing lever 12a, 12b provided with the outer bearing flange 32a, 32b of the load roller carrier 12, so that two rollers are arranged in pairs on both sides of the inner bearing flange 36a, 36b of the wheelarm 5. The roller 41 is therefore located between the outer bearing lever 12a of the load roller carrier 12 and the inner bearing flange 36a of the wheelarm 5. The roller 42 is located between the inner bearing flange 36a of the wheelarm 5 and the central web 30 of the load roller carrier 12. The roller 43 is located between the central web 30 of the load roller carrier 12 and the inner bearing flange 36b of the wheelarm 5. The roller 44 is located between the inner bearing flange 32b of the wheelarm 5 and the outer bearing lever 12b of the load roller carrier 12.

Figure 7:
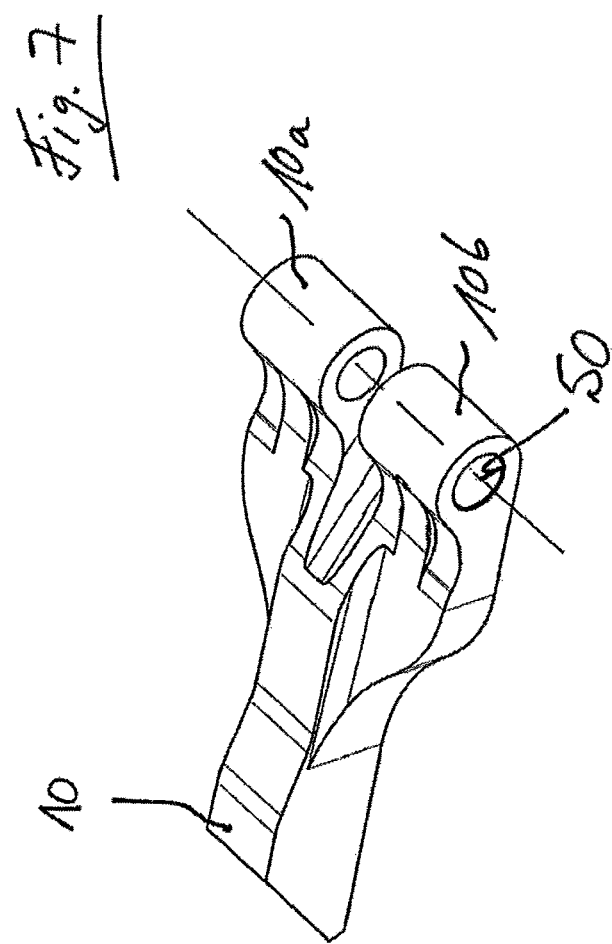
FIG. 7 is a perspective view of a linkage of the industrial truck of the invention.

The linkage 10 (as illustrated in FIG. 7) is provided for articulated coupling with the load roller carrier 12. The linkage 10 is a bearing fork that includes two bearing segments 10a, 10b, in which there is a through bore 50 for the mounting of the coupling pin 21. The bearing segment 10a is located between the outer bearing lever 12a and the central web 30 of the load roller carrier 12 and the bearing segment 10b is located between the outer bearing lever 12b and the central web 30 of the load roller carrier 12. The web 30 of the load roller carrier 12 is located between the two bearing segments 10a, 10b of the linkage 10.

Stop means 60 are located between the load roller carrier 12 and the wheelarm 5 for the lowered position of the wheelarm 5. The stop means 60 are formed by wing-like projections 61a, 61b on the outer sides of the bearing levers 12a, 12b of the load roller carrier 12, which interact with stop surfaces 62 on side plates of the wheelarm 5. The stop means 60 limit the swiveling movement of the load roller carriers 12 upwardly in the fully lowered position of the wheelarms 5 and in connection with the design of the linkage 10 which actuates the corresponding load roller carrier 12, make it possible to leave an open space in the fully lowered position between the rollers 41, 42, 43, 44 and the linkage 10, which permits rotation of the rollers 41, 42, 43, 44 on the bearing pin 25. In addition, when the wheelarms 5 are lowered, whereby the wing-like projections 61*a*, 61*b* of the load roller carrier 12 are supported by the stop surfaces 62 directly on the wheelarms 5, the forces exerted on the bearing pin 20 and the coupling pin 21 are reduced.

The mounting of the bearing pin 20 and of the coupling pin 21 of the invention and the design of the load roller carrier 12 of the invention with the additional central web 30, on which there are additional bearing flanges 32*c*, 33*c* for the bearing pin 20 and the coupling pin 21, make it possible to reduce the diameter of the bearing pin 20 and the coupling pin 21 compared with conventional industrial truck, so that the height H of the wheelarms 5 can be reduced, thereby making it possible to handle special pallets with a low entry height.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. An industrial truck, comprising:
   a drive section;
   a load section movable relative to the drive section;
   at least one wheelarm connected to the load section and including at least one load roller, wherein the load roller is rotatably mounted in a load roller carrier and the load roller carrier is swivel-mounted by a swivel bearing on the wheelarm, wherein the swivel bearing of the load roller carrier comprises a bearing pin mounted on the wheelarm;
   a linkage operatively connected with the load roller carrier, wherein the linkage is connected in an articulated manner by a coupling pin with the load roller carrier;
   at least one stopping projection extending from an outer surface of the load roller carrier, the at least one stopping projection being located between the load roller carrier and the wheelarm for a lowered position of the wheelarm, and
   a through-hole formed in a vertical sidewall of the at least one wheelarm to define a stop surface for receiving and contacting the at least one stopping projection when the wheelarm is lowered,
   wherein the load roller carrier includes two outer bearing levers including bearing pin bearing flanges for mounting of the bearing pin and coupling pin bearing flanges for mounting of the coupling pin and the load roller carrier includes at least one web located between the outer bearing levers, and wherein the web includes a bearing flange for mounting of the bearing pin and a bearing flange for mounting of the coupling pin.

2. The industrial truck of claim 1, wherein the wheelarm includes outer bearing flanges for mounting of the bearing pin and inner bearing flanges for mounting of the bearing pin, wherein the outer bearing levers of the load roller carrier are located respectively between the outer bearing flange and the inner bearing flange of the wheelarm.

3. The industrial truck of claim 1, wherein the web of the load roller carrier is located between the two inner bearing flanges of the wheelarm.

4. The industrial truck of claim 1, wherein the linkage comprises a bearing fork including two bearing segments for mounting of the coupling pin, wherein the bearing fork is located between the outer bearing levers of the load roller carrier, and wherein the web of the load roller carrier is located between the two bearing segments of the linkage.

5. The industrial truck of claim 1, wherein the wheelarm, in a fully lowered position of the load section, has a wheelarm height of less than 50 mm above a road surface.

6. A system comprising:
   an industrial truck of claim 1 having a maximum wheelarm height in a fully lowered position of the load section of 50 mm; and
   a special pallet, wherein the special pallet has an entry height of a pickup opening for the wheelarms of the industrial truck of 50 mm between a road surface and an underside of a load-bearing surface of the special pallet.

* * * * *